United States Patent
Copeland et al.

(10) Patent No.: US 11,875,684 B1
(45) Date of Patent: Jan. 16, 2024

(54) CUSTOMIZATION OF SHARING OF RIDES

(71) Applicant: Wells Fargo Bank, N.A., San Francisco, CA (US)

(72) Inventors: Jennifer L. Copeland, San Francisco, CA (US); Suzanne M. Fisi, Clayton, CA (US); Simone O. Harvey, Berkeley, CA (US); David C. Hatch, Pacifica, CA (US); Muhammad Farukh Munir, Pittsburg, CA (US); Aaron Francis Colfax Petrik, Alameda, CA (US); Darrell L. Suen, San Ramon, CA (US); Timothy R. Ward, Mesa, AZ (US); Steven J. Wirt, Oakland, CA (US); Ryan J. Wyler, Gilbert, AZ (US); Nancy B. Zimmerman, Fairfax, CA (US); Chris Kalaboukis, San Jose, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 644 days.

(21) Appl. No.: 16/792,541

(22) Filed: Feb. 17, 2020

Related U.S. Application Data

(63) Continuation of application No. 16/170,757, filed on Oct. 25, 2018, now Pat. No. 10,593,213, which is a
(Continued)

(51) Int. Cl.
*G08G 1/00* (2006.01)
*G01C 21/34* (2006.01)
(Continued)

(52) U.S. Cl.
CPC ......... *G08G 1/202* (2013.01); *G01C 21/3438* (2013.01); *G06Q 50/30* (2013.01);
(Continued)

(58) Field of Classification Search
CPC .... G08G 1/202; G01C 21/3438; G06Q 50/30; G06Q 20/10; G06Q 30/0283; H04L 67/10
(Continued)

(56) References Cited

U.S. PATENT DOCUMENTS

| 7,756,633 B2 | 7/2010 | Huang et al. |
| 8,140,256 B1 | 3/2012 | dos-Santos et al. |

(Continued)

FOREIGN PATENT DOCUMENTS

| WO | 2015005948 | 1/2015 |
| WO | 2015099679 | 7/2015 |
| WO | 2015171776 | 11/2015 |

OTHER PUBLICATIONS

Adler, Ben; "These new ride-sharing apps actually involve sharing rides"; https://grist.org/business-technology/these-new-ride-sharing-apps-actually-involve-sharing-rides/; Apr. 8, 2015. (Year: 2015).*
(Continued)

*Primary Examiner* — Dione N. Simpson
(74) *Attorney, Agent, or Firm* — Merchant & Gould P.C.

(57) ABSTRACT

Customization of sharing of rides can involve the grouping of passengers in vehicles according to objective and subjective parameters and preferences. In some embodiments, vehicles or other components of the system are equipped to identify and compare information about users of the system using biometric scanning. In some embodiments, fares for rideshares can be tied to a projected quality or desirability of the rideshare for a user or users of the system.

18 Claims, 11 Drawing Sheets

Related U.S. Application Data continuation of application No. 15/422,760, filed on Feb. 2, 2017, now Pat. No. 10,147,325.

(51) Int. Cl.
*G06Q 50/30* (2012.01)
*G06Q 30/0283* (2023.01)
*H04L 67/10* (2022.01)
*G06Q 20/10* (2012.01)

(52) U.S. Cl.
CPC ......... *G06Q 20/10* (2013.01); *G06Q 30/0283* (2013.01); *H04L 67/10* (2013.01)

(58) Field of Classification Search
USPC .......................................................... 701/24
See application file for complete search history.

(56) References Cited

U.S. PATENT DOCUMENTS

| | | |
|---|---|---|
| 9,205,805 B2 | 12/2015 | Cudak |
| 9,426,225 B2 | 8/2016 | Penilla et al. |
| 9,429,947 B1 | 8/2016 | Wengreen et al. |
| 9,562,785 B1 | 2/2017 | Racah et al. |
| 2001/0037174 A1 | 11/2001 | Dickerson |
| 2006/0276960 A1 | 12/2006 | Adamczyk et al. |
| 2007/0276595 A1 | 11/2007 | Lewinson et al. |
| 2008/0074234 A1* | 3/2008 | Nelson ............... B60R 25/04 340/5.2 |
| 2008/0077309 A1 | 3/2008 | Cobbold |
| 2008/0091342 A1 | 4/2008 | Assael |
| 2008/0270019 A1 | 10/2008 | Anderson et al. |
| 2009/0005963 A1 | 1/2009 | Jarvinen |
| 2009/0248587 A1* | 10/2009 | Van Buskirk .. G06Q 10/06 3112 707/999.005 |
| 2011/0145089 A1 | 6/2011 | Khunger et al. |
| 2012/0232776 A1 | 9/2012 | Gontmakher et al. |
| 2013/0060586 A1 | 3/2013 | Chen et al. |
| 2014/0047346 A1 | 2/2014 | Karamchedu |
| 2014/0188775 A1 | 7/2014 | Lehmann et al. |
| 2014/0222298 A1 | 8/2014 | Gurin |
| 2015/0166009 A1 | 6/2015 | Outwater |
| 2015/0185020 A1 | 7/2015 | Gimpl et al. |
| 2015/0204684 A1 | 7/2015 | Rostamian et al. |
| 2015/0310379 A1 | 10/2015 | Farrelly et al. |
| 2015/0324717 A1 | 11/2015 | Lord et al. |
| 2015/0324944 A1 | 11/2015 | Lord et al. |
| 2015/0325128 A1 | 11/2015 | Lord et al. |
| 2016/0012461 A1* | 1/2016 | Paul ...................... G06Q 10/02 705/5 |
| 2016/0025507 A1 | 1/2016 | Bai et al. |
| 2016/0034845 A1* | 2/2016 | Hiyama ......... G06Q 10/06 3114 705/7.15 |
| 2016/0125735 A1 | 5/2016 | Tuukkanen |
| 2016/0138928 A1 | 5/2016 | Guo et al. |
| 2016/0140480 A1 | 5/2016 | Dias et al. |
| 2016/0171574 A1 | 6/2016 | Paulucci et al. |
| 2016/0187150 A1 | 6/2016 | Sherman et al. |
| 2016/0209220 A1 | 7/2016 | Laetz |
| 2016/0320195 A1 | 11/2016 | Liu et al. |
| 2016/0321566 A1 | 11/2016 | Liu et al. |
| 2016/0349067 A1 | 12/2016 | Fowe |
| 2016/0356615 A1 | 12/2016 | Arata et al. |
| 2017/0097240 A1 | 4/2017 | Murrish et al. |
| 2017/0132934 A1 | 5/2017 | Kentley et al. |
| 2017/0167882 A1 | 6/2017 | Ulloa Paredes et al. |
| 2017/0169366 A1* | 6/2017 | Klein ................ G06Q 10/047 |
| 2017/0192437 A1 | 7/2017 | Bier et al. |
| 2017/0197710 A1* | 7/2017 | Ma ..................... G08G 5/0013 |
| 2017/0243172 A1 | 8/2017 | Dayama et al. |
| 2017/0249847 A1 | 8/2017 | Marueli |
| 2017/0270447 A1 | 9/2017 | Borean et al. |
| 2017/0284820 A1 | 10/2017 | Dryjanski et al. |
| 2017/0314948 A1 | 11/2017 | Racah et al. |
| 2017/0316533 A1 | 11/2017 | Goldman-Shenhar et al. |
| 2017/0328732 A1 | 11/2017 | Vandanapu |
| 2017/0365030 A1 | 12/2017 | Shoham et al. |
| 2017/0372235 A1* | 12/2017 | Dayama ................. G06Q 10/06 |
| 2018/0033058 A1 | 2/2018 | Mukherjee et al. |
| 2018/0038704 A1 | 2/2018 | Nilsson et al. |
| 2018/0039917 A1 | 2/2018 | Buttolo et al. |

OTHER PUBLICATIONS

Fischer, Igor, "Passenger/Owner Matching in Shared Mobility Using Autonomous Vehicles" (2016) http://www.dr-fischer.org/pub/PassengerMatching.pdf.

Strong, Michael, "Nu' Autonomous Taxi Service Beats Uber to Punch" (Aug. 25, 2016) http://www.thedetroitbureau.com/2016/08/nu-autonomous-taxi-service-beats-uber-to-punch/.

Tully, Jim et al., "Internet of Things Primer for 2016," Mar. 31, 2016, 8 pages.

Velosa, Alfonso, et al., "Hype Cycle for the Internet of Things, 2016," Jul. 14, 2016, 68 pages.

Velosa, Alfonso et al., "Maturity Model for the Internet of Things," Mar. 2, 2016, 18 pages.

Tully, Jim, "IoT: Key Lessons to Date and Action Plan for 2016," Feb. 12, 2016, 8 pages.

Prentice, Stephen, "The Six Forces That Will Shape Business and Technology in 2030," Feb. 1, 2016, 9 pages.

Friedman, Ted et al., "Predicts 2016: Unexpected Implications Arising From the Internet of Things," Dec. 3, 2015, 13 pages.

Cearley, David W. et al., "Top 10 Strategic Technology Trends for 2016," Feb. 29, 2016, 15 pages.

Burke, Brian et al., "Top 10 Strategic Technology Trends for 2016: Internet of Things Architecture and Platforms," Feb. 19, 2016, 11 pages.

Cearley, David W. et al., "Top 10 Strategic Technology Trends for 2016: Ambient User Experience," Feb. 26, 2016, 11 pages.

Walker, Mike J. et al., "Top 10 Strategic Technology Trends for 2016: Information of Everything," Feb. 26, 2016, 11 pages.

Plummer, Daryl C. et al., "Top Strategic Predictions for 2016 and Beyond: The Future Is a Digital Thing," Oct. 2, 2015, 27 pages.

Jones, Nick, "Top 10 IoT Technologies for 2017 and 2018," Jan. 22, 2016, 12 pages.

Geschickter, Chet et al., "Measuring the Strategic Value of the Internet of Things for Industries," Apr. 28, 2016, 14 pages.

Furlonger, David et al., "Toolkit: IoT Strategic Technology Map for Financial Services Initiatives," Dec. 2, 2015, 4 pages.

Furlonger, David et al., "Survey Analysis: Financial Services CIOs Should Not Ignore the Internet of Things," Mar. 17, 2015, 17 pages.

Moyer, Kristin R. et al., "Measuring the Strategic Value of Financial Services IoT," Dec. 2, 2015, 10 pages.

Newton, Alistair et al., "Gartner's Digital Banking Customer Advisory Framework," Jul. 7, 2016, 8 pages.

Moyer, Kristin R., "Industry Vision: Banks as Platforms," Apr. 22, 2016, 11 pages.

Moyer, Kristin R. et al., "Industry Vision: Tipping Point for Banks as Platforms," May 3, 2016, 11 pages.

Moyer, Kristin R., "The Economics of Connections for Banking," Mar. 8, 2016, 12 pages.

Geschickter, Chet et al., "Survey Analysis: Early Adopters of Internet of Things Poised to Make 2016 the Year of the Customer," Feb. 12, 2016, 15 pages.

Lehong, Hung et al., "Building a Digital Business Technology Platform," Jun. 8, 2016, 21 pages.

* cited by examiner

420

422

Rate the importance to you of each of the following characteristics of your fellow passengers, 1 being not important at all, 5 being essential

424

Age: _____

426

Gender: _____

428

Level & Education: _____

430

Political Persuasion: _____

432

Profession: _____

434

Reserved(little to no conversation): _____

436

Talkative: _____

442
You indicated that the age, gender, education level, political persuasion, and profession of your fellow passengers is at least of some importance to you. Please identify your preferences:

444
Age: <18 | 18-30 | 31-50 | >51 | Other: ___

446
Gender: Male | Female | Other: ___

448
Education: High School | College | Graduate School | Other: ___

450
Politics: Democrat | Republican | Green | Other: ___

452
Profession: _____

Your rideshare is complete. You have been charged $30. Please rate your rideshare experience :

480

Fare: Reasonable | Unreasonable : Why? _____

482

Vehicle Cleanliness: 1 2 3 4 5

484

Your satisfaction with the other passengers:

N/A | Satisfied | Unsatisfied

What about the other passengers was unsatisfactory ?

Their Age

Their Gender

Their Education

490

Their Political Possession

Their Profession

Other: ____

FIG. 9B

CUSTOMIZATION OF SHARING OF RIDES

BACKGROUND

Ridesharing or pooling of passengers is becoming a cost effective way for unaffiliated or random groups of individuals to share a vehicular transport, such as a taxi ride. As technology advances, more and more vehicles, including those used for rideshares, will be operated autonomously (i.e., without human control), or partially autonomously (e.g., without a human driver in the vehicle).

SUMMARY

In accordance with certain aspects of the present disclosure, a system for customizing rideshares is provided in which passengers are pooled together for transport in the same vehicle based on one or more preferences shared among the passengers. In some examples, the preferences can be selected from political preferences, social preferences, economic preferences, environmental preferences, gender preferences, age preferences, or other ridesharing preferences. In some examples, passengers who are denied access to a particular rideshare are automatically provided with a substitute rideshare.

In accordance with certain aspects of the present disclosure, a system for customizing rideshares is provided in which preferences of the passengers in the rideshare partially determine a fare for the rideshare.

DESCRIPTION OF THE DRAWINGS

FIG. 7A depicts a further example user interface display showing an example user input screen on a user device of the system of FIG. 1.

FIG. 7B depicts a further example user interface display showing an example user input screen on a user device of the system of FIG. 1.

FIG. 9A depicts a further example user interface display showing an example user input screen on a user device of the system of FIG. 1.

FIG. 9B depicts a further example user interface display showing an example user input screen on a user device of the system of FIG. 1.

DETAILED DESCRIPTION

Figure 1:
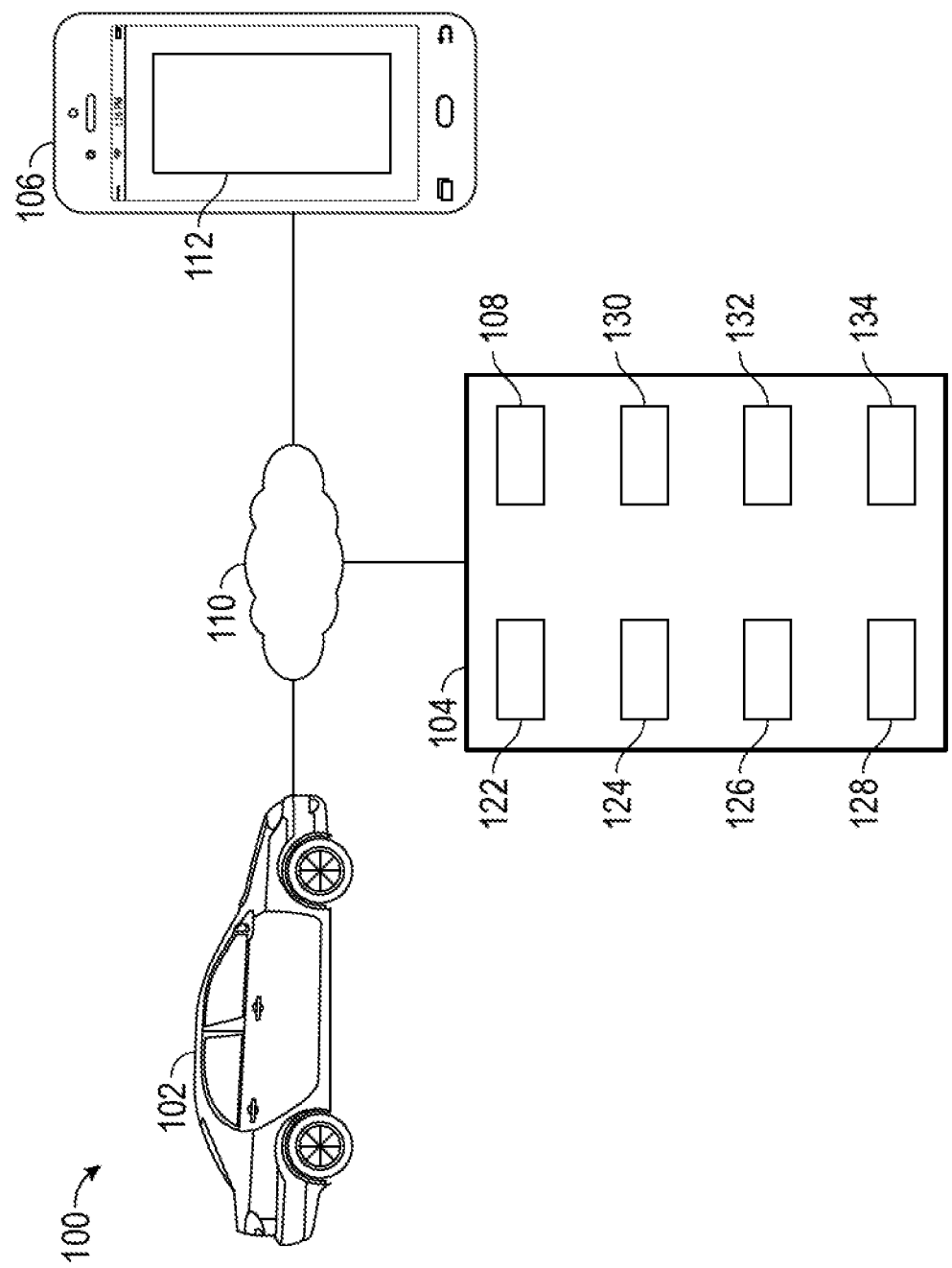
FIG. 1 is a block diagram illustrating an example of a system for customizing rideshares in accordance with aspects of the present disclosure.

In the following Detailed Description, reference is made to the accompanying drawings, which form a part hereof, and in which is shown by way of illustration specific embodiments which may be practiced. The following detailed description, therefore, is not to be taken in a limiting sense.

Features of the systems and methods for customizing rideshares disclosed herein can benefit users of the systems/methods by improving ridesharing experiences for the users and reducing the incidence of undesirable rideshare experiences.

Sharing a ride with one or more strangers carries inherent risks. Fellow passengers can create a distasteful or even dangerous ridesharing experience for myriad reasons. An extreme example of a high risk person with whom to share a ride is a convicted violent criminal. Less extreme examples would be sharing a ride with verbally offensive individuals or individuals who, for any number of reasons, make another passenger uncomfortable in an enclosed space. As more and more vehicles become autonomous and the population increases, the popularity of ridesharing is likely to increase. At the same time, the risks attending ridesharing with strangers in autonomous vehicles become magnified, as the driver who, in a vast majority of situations is trustworthy and can be counted on to ensure a safe and orderly ride, is eliminated.

Ridesharing experiences can also be extremely positive. Rideshares can provide unique human to human networking opportunities in which interactions with strangers in the rideshare can engender many different positive consequences, such as a friendship or a professional relationship. The features of the systems and methods disclosed herein, in some examples, can help to optimize the chances of finding such positive network opportunities in a rideshare by grouping passengers based on factors such as their profession, age, political views, education, socio-economic standing, and so forth.

The features of the systems and methods disclosed herein can in some examples also benefit users by empowering them to pay for rideshares in a manner commensurate with how much they value an anticipated ridesharing experience. By enabling passengers to pay more for more desirable ridesharing experiences and less for less desirable ridesharing experiences, the economics and efficiencies of ridesharing are improved.

The foregoing and other advantages provided by the disclosed systems and methods are impractical or impossible in conventional ridesharing systems. In an example conventional ridesharing system, a driver of a van picks up a number of unaffected people at an airport and takes them to various locations in a nearby city. Other than making sure the passengers are not travelling to locations that are too far from one another, there is little, if any, control the driver or any of the passengers has at the outset over the quality of the ridesharing experience, where the quality is defined as a function of the group of selected passengers themselves.

For example, there is no way of knowing or predicting if the group of passengers are likely to get along or to make one another uncomfortable or otherwise unhappy during the ride. One passenger may want nothing more than to sit quietly or sleep, while another may want to chat about politics for the entire ride. Nor can a passenger receive a discount fare for agreeing to share a ride with less desirable passengers or pay a premium for sharing a ride with more desirable passengers. Thus, features of the system and methods disclosed herein provide levels of passenger control and customization not previously attainable for rideshares.

FIG. 1 is a block diagram illustrating an example of a system 100 for customizing rideshares in accordance with aspects of the present disclosure. The system 100 includes at least one vehicle 102. In some examples, the system 100 includes many vehicles. The vehicles of the system can be associated with any desired geographic area or areas. In some examples, the vehicle 102 is autonomous or partially autonomous. In other examples, the vehicle 102 is operated or operable by a driver.

The system 100 further includes at least one server 104. In some examples, the server 104 can be one of a network of servers (e.g., a "cloud") of the system 100. In some examples, each server in the network of servers can be adapted to perform a specific function or functions on behalf of the system 100. Although specific functionalities will be attributed to the server 104 in this disclosure, it should be appreciated that these and other functionalities can be divided among a network of interconnected servers. Thus, throughout this disclosure, the server 104 can alternatively be understood as a single server or a network of servers.

The server 104 includes one or more computing devices configured to operate together. The server 104 includes one or more databases 108 and one or more modules containing instructions executable by a computer processor, the one or more databases being accessible to the one or more modules. The modules can include, for example, a user initiation module 122, a data mining module 124, a passenger verification module 126, a vehicle network module 128, a passenger comparison module 130, a ride pricing module 132, and a ride payment module 134, which will be described in more detail below. It should be appreciated that various functionalities of the rideshare customization system disclosed herein can be carried out by one or more of the specifically enumerated modules disclosed, or alternatively by other modules of the system that may not be explicitly disclosed but are configured to carry out the disclosed functionality.

The system 100 further includes at least one device 106 associated with a user of the system 100. The system 100 will typically have a plurality of users, each with their own user device 106. By "user" is meant a member or of the system 100, i.e., someone authorized to use the system 100. A user can be an individual or a group of individuals, e.g., a family. A user can be a passenger (i.e., a user who is already participating in a rideshare) or a prospective passenger (i.e., a user who is requesting a rideshare) of the system 100. A prospective user of the system 100 is an individual or group of individuals who is not a member the system 100 but wishes to be a member of the system 100. The user device 106 can be any device adapted to connect the user to interact with other components of the system 100. Non-limiting examples of user devices 106 include smart phones, tablets, cell phones, computers, wearable communications devices such as watches, IOT ("Internet of Things") devices and so forth.

The user device 106 facilitates communication, transactions and/or potential transactions between a user and other parts of the system 100. The user device can be linked to a financial account of the user (e.g., a credit card account, a checking account, a savings account, an investment account) for purposes of, e.g., paying membership fees for being a user of the system, and/or for paying for rides. The user device 106 includes a user interface 112. The user interface 112 provides an interacting platform between the user and the system 100. The user interface 112 can provide output provided by, and/or receive input required by, the system's various program modules. The user interface 112 can include any suitable medium for input and output of information, including but not limited to one or more of a touch/display screen, a voice command interface, a keyboard, a mouse, etc. For purposes of illustration, the user device 106 will be presumed to have a graphical user interface for displaying information, as depicted in some of the figures.

The various components of the system 100, as well as components outside of the system 100 that are accessed by the system, e.g., a server/database of a financial institution that manages a financial account of a user, or a server/database of a social media platform of which a user is a member, interact via a data communication network ("network") 110, e.g., the Internet. Additionally, in some examples, the various interactive components inside and outside of the system 100 can interact via one or more application program interfaces (API). For purposes of this disclosure, computer systems or components thereof that are outside the system 100 but interact with the system 100 will, in some cases be referred to as "third party" components, such as third party servers or third party databases.

The database 108 can be a single database or a network of databases and, for purposes of this disclosure, can be either. The database 108 or network of databases, in combination with any third party databases are readable and writable repositories of data required by the system 100 to provide customized rideshares to its users in accordance with principles of the present disclosure. Thus, the database(s) store(s) data used by the system 100. Examples of data used by the system 100 include data about users, such as contact information, financial account information, personal information (e.g., gender, age, income, political persuasion, religion, level of education, criminal record, language(s) spoken, relationship status, etc.), ridesharing preference information, social media information, as well as information about users' past experiences with the system 100. Further examples of data stored by the database 100 include information about vehicles used by the system, such as a vehicle's associated geographic region, the age and mileage of a vehicle, the maximum number of passengers a vehicle can hold, the last time a vehicle was serviced, safety incidents involving the vehicle, information about internal systems and hardware of the vehicles, and so forth.

The user initiation module 122 is configured to initiate new users to the system 100. The user initiation module processes information from a potential user of the system and ensures that sufficient information has been provided. Such information can include user identifying information, such as name, address, date of birth, and also permissions for the system to access other information about the potential user, such as permissions to access information from the user's social media accounts, financial accounts, etc. If insufficient information or permissions have been provided, the user initiation module can cause the system 100 to prompt the potential user for more information or permissions. In some examples, the user initiation module 122 can perform one or more functions to verify the information provided by the potential user. Once sufficient information and permissions in connection with a potential user have been received by the system 100 (and, in some examples, verified), the user initiation module 122 initiates the potential user as a user of the system 100. User initiation can carry an associated fee for the new user, a periodic subscription fee, or alternatively be free of charge. In some examples, the user initiation module 122 links the system 100 to one or more financial accounts of the user. Permissions can be set by the new user via the user initiation module 122 to allow the system 100 to debit funds from the user's linked financial account(s) when making a transaction on the system 100, e.g., when the user requests and/or completes a rideshare provided by the system 100.

In some examples, a potential user or existing user of the system 100 downloads and installs a software application on a device 106 that electronically links the user device to the system 100. Once installed on the device 106, the software application can enable a prospective user to initiate a new account with the system 100, and an existing user to connect to and use (e.g., request and pay for rideshares) the system 100. In some examples, access to a user's account on the system 100 requires logging in with credentials to verify the user's identity and authorization to use the account in question.

The data mining module 124 identifies and collects information about users of the system 100 that is relevant to matching each user with other users of the system for a given rideshare and thereby customize individual rideshare experiences.

Such information can include any information about users of the system 100 indicative of who those users would be more interested or less interested in sharing rides with. In some examples, such information is entered into the system directly by a user. For example, the system 100 can prompt a user to identify, e.g., via a series of questions, more desirable and less desirable characteristics of potential fellow passengers. In other examples, the data mining module 124 mines match-relevant information about users from sources other than user inputs, such as the users' social media accounts, web activity, government records, education records, occupation records, and so forth. The data mining module can be configured to process the various pieces of collected match-relevant information to generate a ridesharing profile for each user based on the match-relevant information.

For example, a first user of the system 100 can themselves be a Republican, which information can be gleaned by the data mining module 124 and/or affirmatively submitted by the first user to the system. That the first user is a Republican is, as used herein, a parameter or characteristic of the first user that may be relevant to a second user's desirability to share a ride with the first user. Meanwhile, the first user can prefer to ride with Democrats, which information can be gleaned and/or affirmatively confirmed by the data mining module 124 and/or affirmatively submitted by the first user to the system. That the first user prefers to ride with Democrats is, as used herein a, preference or parameter preference of the first user. Ridesharing profiles can include both parameters and parameter preferences of the users.

Ridesharing profiles of different users can be used by the system to evaluate potential rideshares. Ridesharing profiles can be static or dynamic. An example of a static ridesharing profile is one that can be modified only by active modification of the user to whom the profile belongs. An example of a dynamic ridesharing profile is one that is modified by the system without a specific request to do so by the user. For example, the system 100 can modify an existing ridesharing profile in response to mining data about the user that is inconsistent with the existing ridesharing profile. In addition, the system 100 can modify an existing ridesharing profile in response to feedback about completed rideshares involving the user to which the profile belongs. In other words, the system 100 can learn from actual rideshare feedback provided by a given user, as well as feedback (e.g., reviews) provided about that given user from other users in order to optimize ridesharing experiences for users of the system 100 by adjusting a user's ridesharing profile (e.g., by adjusting a user's parameters or parameter preferences) in response to such feedback. Other examples include hybrid variations in which ridesharing profiles are modifiable by both static and dynamic means.

As discussed, ridesharing profiles can include both ridesharing parameters and ridesharing parameter preferences. A ridesharing parameter is a characteristic of a user or vehicle of the system 100 that may carry some importance to another user's ridesharing preferences. A ridesharing parameter preference is a user's preference regarding a characteristic of their fellow passengers or the vehicles they ride in.

In some examples, the data mining module 124 can be configured to assign relative values to different pieces of collected information, depending on how relevant to a given rideshare experience the information is. A ridesharing profile can include any number of different data parameters and preferences associated with the user to whom the profile belongs. These parameters and preferences can be input to the system by the user themselves (i.e., affirmative parameters or preferences) and/or gleaned by the data mining module 124 (i.e., passive parameters or preferences). An example affirmative parameter is a user's gender that they input to the system 100. An example affirmative parameter preference is a user input to the system identifying a preferred passenger gender with which to be grouped with in a rideshare. An example passive parameter is the system's gleaning from one or more accessible data sources that a user is a Democrat. An example passive parameter preference is the system's gleaning from one or more accessible data sources that a user prefers to be grouped with passengers of similar political persuasion to themselves.

The passenger verification module 126 is an optional module that verifies a passenger's identity before permitting entry of that passenger into a vehicle of the system 100. The passenger verification module 126 can thus be configured to generate signals that can be sent to hardware (e.g., door locks), in the vehicle itself to operate that hardware according to information received about a person attempting to enter the vehicle.

For example, before permitting a user entry to a vehicle, the vehicle can verify the user's identity, e.g., through biometric recognition—collecting biometric information from the user (e.g., through scanning a fingerprint, face, eye, etc.) and cross-referencing the collected information against previously stored biometric data about the user (e.g., an image provided at the user initiation stage). The biometric recognition can be performed with a biometric recognition device (e.g., a fingerprint scanner, eye scanner, face scanner) disposed on the vehicle.

Once the biometric recognition device captures the relevant biometric data, the passenger verification module 126 processes the captured data and cross-references it against the stored data. If the passenger verification module 126 verifies the biometric data, the individual can be permitted access to the vehicle, e.g., by unlocking a door to the vehicle. In some examples, even if the passenger verification module 126 verifies the biometric data, the user can nevertheless be denied access to the vehicle for one or more reasons; in some of these examples, the system can be configured to search for another vehicle for the user to ride in. If the passenger verification module 126 is unable to verify an individual's identity based on the biometric data, the individual can be denied access to the vehicle, e.g., by locking the doors to the vehicle or keeping the doors locked. In some examples, denial of access to the vehicle can be communicated to the user, e.g., as a notification displayed on, or otherwise indicated by, the vehicle, and/or as a notification sent to the user and accessible via the user device 106.

The vehicle network module 128 monitors and processes data relating to vehicles associated with the system 100. Such data can include, for example, each vehicle's location, number of passengers, current destination, traffic conditions near the vehicle, fuel/battery level, cleanliness, etc. Locations of vehicles and ride requesting users (i.e., prospective passengers) at any given time can be determined by any appropriate positioning device or system using positioning devices.

In the case of a vehicle, a positioning device can be coupled to the vehicle itself. In the case of a user, the positioning device can be coupled to the user device 106. Non-limiting examples of such positioning devices and systems include, e.g., global positioning systems and devices, cellular tower triangulation, and Internet of Things (IOT) devices, which can be used to track a user device 106 or vehicle based on its proximity to an object with a known location. In some examples, the positioning device locates the user device or vehicle based on the vehicle/user device's connectivity to a particular Wi-Fi network associated with a known location.

The vehicle network module 128 can also monitor passenger behavior inside the vehicle (e.g., with video cameras and/or microphones) and, in some examples, evaluate the quality of the rideshare based on observed behavior of the passengers, which can be used to adjust a ridesharing profile of one or more of the passengers in that vehicle to the extent the observed behavior of a passenger in the vehicle is inconsistent with that passenger's ridesharing profile (i.e., by adjusting ridesharing parameters and/or by adjusting ridesharing parameter preferences).

In some examples, when a user of the system 100 requests a rideshare from the system, the vehicle network module 128 is also configured to identify potential vehicles to accommodate the request based on one or more objective parameters, with the goal being to optimize those objective parameters for the requesting party, e.g. by finding vehicles with objective parameters that match a user's (and/or the system's) objective parameter preferences. Thus, in some examples, users' ridesharing profiles can include objective parameter preferences. In some examples, the vehicle network module 128 identifies a subset of vehicles of the entire set of vehicles associated with the system 100 that meet one or more objective parameter preferences of the user and/or the system itself and then passes that subset of vehicles to the passenger comparison module 130.

Such objective parameters can include, e.g., a vehicle's proximity to the user and direction of travel at the time of the request, a vehicle's fuel/power level in relation to the distance the user has requested to travel and the anticipated traffic expected to be encountered en route, the number of passengers in the user's party, the current number of available seats in the vehicle or the anticipated number of available seats by the time the vehicle would arrive at the user's location (if the vehicle is already committed to picking up or attempting to pick up another user prior to reaching the requesting user's location), and objective parameters preferences provided by the user requesting the ride.

Objective parameter preferences can be determinative or merely relevant. A determinative objective parameter preference is one that is required to be met, but not necessarily sufficient in and of itself, to be included in the subset of vehicles passed on to the passenger comparison module 130. An example of a determinative objective parameter preference is a vehicle's ability to reach the location of the prospective passenger within a certain time frame, e.g., 15 minutes, or the vehicle's being located in the same city as the prospective passenger.

A relevant objective parameter preference need not be met by a vehicle for the vehicle to be included in the subset that is passed to the passenger comparison module 130, but is nevertheless relevant to that analysis. An example of a relevant objective parameter preference is the cleanliness of a vehicle, and the vehicle network module 128 may be more likely, all other things equal, to include a relatively clean vehicle in the subset of vehicles than it is to include a relatively dirty vehicle.

Objective parameter preferences can be determined by the system (e.g., the system 100 is configured for all users to only consider vehicles that are in the same city as the prospective passenger) or by the user, e.g., a user sets the objective parameter preference that they prefer no more than two additional passengers in their rideshare, or the objective parameter preference that the ride share may not exceed a predefined maximum price, or the objective parameter preference that a vehicle be rated at at least a predefined minimum threshold for cleanliness.

In some examples, point values can be assigned to each objective parameter preference based on that preference's importance to the overall quality of the rideshare (for example, a user requesting a rideshare may require no more than one additional passenger in the vehicle but care less about the cleanliness of the vehicle). Objective parameter preferences that are met by the actual parameters of a vehicle can contribute, proportional to their importance, to a vehicle value, the vehicles with the N largest vehicle values (N being a pre-defined positive integer) and any and all determinative objective parameter preferences met, being selected for the subset of vehicles that is passed to the passenger comparison module 130 for further processing and analysis. In other examples, any vehicle of the system 100 that meets or exceeds a predefined minimum vehicle value can be included in the subset of vehicles that is passed to the passenger comparison module 130.

In some examples, the passenger comparison module 130 selects a particular vehicle from the subset of vehicles identified by the vehicle network module 128 to assign to pick up a prospective passenger who has requested a rideshare. The passenger comparison module 130 customizes the rideshare by selecting a vehicle from the provided subset of vehicles based on a comparison of the prospective passenger's ridesharing profile, and the ridesharing profiles of each of the passengers anticipated to be in each of the subset of vehicles at the time the vehicle would arrive at the requesting user's location. Thus, the passenger comparison module 130 is configured to enhance the ridesharing experience of the prospective passenger (and, reciprocally, the experience of other passengers in the rideshare) by selecting the most desirable fellow passenger or passengers to ride in the vehicle with the prospective passenger.

In some examples, ridesharing profiles are compared by comparing the ridesharing parameters of one profile with the ridesharing parameter preferences of another profile, and vice versa. Other comparisons, such as comparing one user's preferences to another user's preferences, or one user's parameters to another user's parameters, may also or alternatively be performed.

In some examples, to the extent an unoccupied vehicle, to which no other rideshare requests is linked, is available among the subset, such a vehicle might be the most desirable option to assign to the prospective passenger. In other examples, the passenger comparison module 130 determines that a vehicle from the subset anticipated to have one or more passengers already in the vehicle when that vehicle will be in a position to pick up the prospective passenger is the vehicle option likely to provide the most desirable ridesharing experience to the prospective passenger (and, reciprocally, to the other passengers of the vehicle). This determination is made by the passenger comparison module 130 by comparing the ridesharing profile of the prospective passenger to the ridesharing profiles of the other passengers in the subset of vehicles and finding matches between the profiles. In some examples, the prospective passenger is assigned the vehicle carrying passenger(s) with ridesharing profile(s) that yield the highest "match score" with the prospective passenger's ridesharing profile.

In some examples, specific types of match scores can be calculated, such as individual match scores or reciprocal match scores. A reciprocal match score is a measure of mutual compatibility among a plurality of users. For example, for a first user and a second user, a reciprocal match score can be calculated by comparing the parameter preferences of the first user with the parameters of the second user, and also comparing the parameter preferences of the second user with the parameters of the first user, the reciprocal match score being a composite result of those two comparisons.

An individual match score is associated with a single user, and reflects a one-way (not necessarily mutual) compatibility with another user. Each user has an individual match score with each other user. For example, an individual match score for a first user of the system with respect to a second user of the system can be calculated by comparing the parameter preferences of the first user with the parameters of the second user. It should be appreciated that an individual match score of a first user with respect to a second user need not align with the individual match score of the second user with respect to the first user.

Any number of profile to profile subjective parameters and parameter preferences can be compared by the passenger comparison module 130 for this purpose of identifying a highest match score or number of high enough match scores. Non-limiting examples of such subjective parameters/parameter preferences that can be included in a ridesharing profile can include parameters/preferences related to gender, age, political affiliation, socioeconomic disposition, occupation, education, sport team affiliation, social tendencies (e.g., loquaciousness), etc. Whether a vehicle in the subset is deemed the highest (or high enough) match vehicle is conditional upon the subjective parameter/parameter preference comparison performed by the passenger comparison module 130.

Subjective parameter preferences can be determinative or merely relevant. A determinative subjective parameter preference is one that is required to be met, but not necessarily sufficient in and of itself, to establish a highest (or high enough) match score. Typically, a determinative subjective parameter will be actively provided to the system 100 by the user. A relevant subjective parameter preference need not be met to establish a highest (or high enough) match score but can be relevant to the analysis. A relevant subjective parameter preference can be actively or passively provided to the system. An example of a determinative subjective parameter preference is a female user's passenger profile parameter preference requiring that that user be grouped only with other female passengers. An example of a relevant subjective parameter preference (whether gleaned by the system 100 actively or passively) is a user's preference to be grouped with passengers with similar political views to their own, or a similar profession to their own.

In some examples, for a potential group of users to ride together, for each pair of those users, a reciprocal match score is calculated by comparing one user's parameters with the other user's parameter preferences and vice versa. Thus, in some examples, two users will not achieve a high enough match score to ride together if, even though the first user's parameters are a good match for the second user's parameter preferences, the second user's parameters are nevertheless not a good match for the first user's parameter preferences. In some examples, therefore, for a reciprocal match score to be high enough for a given pair of users to ride together, there must be a minimum level of reciprocal compatibility between the two users.

In some examples, one or more subjective determinative parameter preferences are pre-set by the system 100 (or, alternatively, set by users) to prevent certain kinds of groupings in rideshare vehicles, e.g., out of a concern for public safety. For example, through subjective determinative parameters, users with criminal records may be precluded from riding with users who have not committed the same types of crimes. As another example, users who are at or above a predefined age (e.g., 15) are precluded from riding with users who are at or below a predefined age (e.g., 14).

In some examples, point values can be assigned to each subjective parameter preference based on that preference's importance to the quality of the rideshare. Subjective parameter preferences that match with subjective parameters between the ride sharing profiles of the prospective passenger and another passenger or passengers can contribute, proportional to their importance, to an overall reciprocal and/or individual match score, the vehicle with the highest reciprocal and/or individual match score (and with any and every determinative subjective parameter preference met), being assigned by the passenger comparison module 130 to pick up the prospective passenger.

In some examples, a minimum reciprocal match score is required for a vehicle to be assigned to a prospective passenger. The minimum reciprocal match score can be pre-defined in the system 100. If the analysis performed by the passenger comparison module 130 fails to yield a single vehicle in the subset with at least the minimum reciprocal match score (that is, there are no available vehicles that are subjectively appropriate to carry the ride requesting passenger), the system 100 denies the prospective passenger's request for a ride, the passenger comparison module 130 generating a notification of denial that is sent to the user's account and observable, e.g., on the user device 106. In the event of a rideshare denial, in some examples the system 100 is configured to repeatedly automatically search for an appropriate vehicle until a vehicle with a high enough reciprocal match score is found.

On the other hand, if the analysis performed by the passenger comparison module 130 yields multiple vehicles within the subset with at least the minimum reciprocal match score, these vehicles can be presented to the prospective passenger as selectable options for the rideshare. The prospective passenger can then select the desired vehicle based on any relevant criteria, such as the options' relative reciprocal match scores, the options' relative individual match scores for prospective passenger, the options' relative prices, the options' proximity to the user's current location, etc.

In some examples, the system 100 can operate as a vehicle hailing system, in which a prospective passenger identifies a specific vehicle of the system to ride in, typically due to its close proximity. The user may be made aware of the vehicle and its proximity by physically seeing the vehicle, or by accessing the system 100 via their user device 106. The vehicle may include an indicator that one or more seats are available in the vehicle (e.g., with an illuminated sign or light visible outside the vehicle); alternatively, such information can be provided to the user device 106. The prospective passenger then hails the vehicle. Hailing the vehicle can be performed through the user device 106 or alternatively by a physical action such as a wave of the hand, a verbal call, a whistle, and so forth. The vehicles of the system 100 can each include a hailing recognition device (e.g., audio and/or visual sensors) configured to recognize physical hailing actions.

Once the vehicle has been hailed, the system 100 is configured to cause the vehicle to stop at the prospective passenger's location or a safe location closest thereto (if the vehicle is not already stopped there at the time of the hailing). At this point the prospective passenger is identified by the vehicle. The vehicle can identify the prospective passenger, e.g., through biometric recognition that is processed by the passenger verification module 126. The biometric recognition can be performed with a biometric recognition device (e.g., a fingerprint scanner, eye scanner, face scanner) disposed on the vehicle that captures the biometric data and passes the data to the passenger verification module 126.

Once the prospective passenger has been identified and verified as a user of the system, the passenger comparison module 130 looks up the ridesharing profile of the prospective passenger and compares it to the ridesharing profile(s) of the one or more passengers already in the vehicle (e.g., by comparing one user's parameters with another's parameter preferences and vice versa). If the profile comparison yields at least a predefined reciprocal match score, the prospective passenger is permitted access to the vehicle (e.g., a signal is sent by the passenger verification module 126 that unlocks the vehicle door). If the profile comparison fails to yield at least the minimum reciprocal match score, the prospective passenger is denied access to the vehicle (e.g., the vehicle doors remain locked, a notification of denial is indicated on the vehicle, and/or a notification of denial is sent to the user and accessible via the user device 106). In the event of a rideshare denial, in some examples the system 100 is configured to repeatedly automatically search for an appropriate vehicle until a vehicle with a high enough reciprocal match score is available for the prospective passenger.

The ride pricing module 132 sets, and in some examples, negotiates, a price for a rideshare provided by the system 100. In some examples, the price for a rideshare can be a relevant or determinative objective parameter preference processed by the vehicle network module 128. An example determinative price parameter is a maximum price a prospective passenger is willing to pay for the rideshare in question.

Prices can be negotiable or non-negotiable, and the negotiability of a price can depend on each specific vehicle considered for a rideshare. If, for a given transaction, price is a determinative objective parameter preference, and a particular vehicle carries a non-negotiable price that falls outside the maximum allowed value of that parameter preference set for the transaction, that vehicle is not an available option for the prospective passenger.

In some examples, each vehicle's price is correlated by the pricing module 132 to the reciprocal match score for that vehicle; the higher the reciprocal match score, the higher the fare. In some examples, each vehicle's price is correlated by the pricing module 132 to the prospective passenger's individual match score for that vehicle (i.e., the match score obtained from comparing only the prospective passenger's parameter preferences to the passenger's parameters), irrespective of the reciprocal match score.

For vehicles with relatively higher individual match scores for the prospective passenger, the pricing module 132 can set relatively higher prices for the rideshare, since the higher match score indicates a higher anticipated ride quality/desirability for the prospective passenger. For vehicles with relatively low individual match scores, the pricing module 132 can set relatively lower prices for the rideshare, since the lower individual match score indicates a lower anticipated ride quality/desirability. Thus, when presented with a plurality of available vehicles each of which exceeds a minimum predefined reciprocal match score, a prospective passenger may elect a vehicle with a lower individual match score in order to take advantage of the lower fare.

In addition, in some examples, prices set by the pricing module 132 may be negotiable. For example, a prospective passenger can agree to waive or modify an objective parameter requirement for a given proposed rideshare in exchange for a lower fare. For example, the prospective passenger can waive their preference regarding the number of passengers sharing their ride in exchange for a fare reduction.

In the rideshare hailing application of the system 100 described above, in some examples the prospective passenger, once accepted for the vehicle but before being permitted to enter the vehicle, must first agree to a price for that rideshare set by the pricing module 132. In setting the price, the pricing module 132 can correlate the price to the individual match score obtained by the passenger comparison module 130 for that vehicle. Notification and acceptance of the set price can be performed on the vehicle itself and/or via the user device 106. In some examples, the price set by the pricing module 132 can be negotiable in accordance with the principles described above.

In some examples of the system 100, an available rideshare opportunity expires after a predefined amount of time. For example, a price must be accepted by the prospective passenger and/or the prospective passenger must enter the vehicle within a predefined period of time of the prospective passenger's request to ride in that vehicle; otherwise the system 100 can be configured to revoke the particular vehicle rideshare opportunity.

The ride payment module 134 is configured to execute a payment from a financial account of a user. The payment can be executed at any appropriate time during the transaction, e.g., when the user enters the rideshare vehicle, when the user exits the rideshare vehicle, during the rideshare, etc. The funds can be transferred to a financial account associated, e.g., with an operator or owner of the vehicles or other aspects of the system 100.

Figure 2:
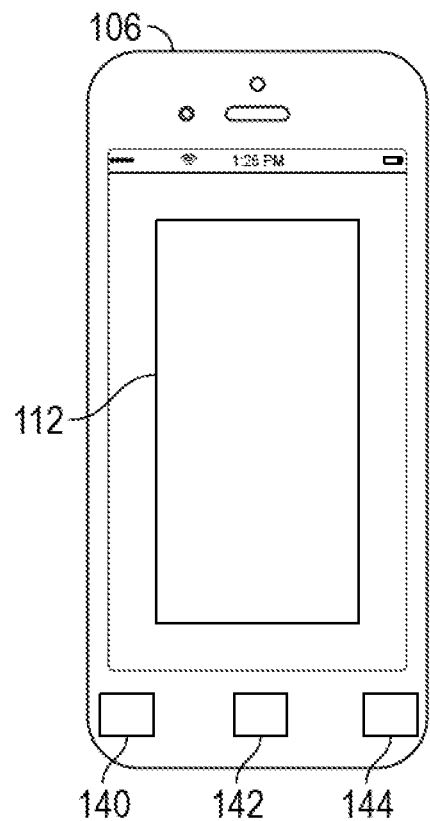
FIG. 2 is a block diagram illustrating more details of an example user device that can be used in the system of FIG. 1.

FIG. 2 is a block diagram illustrating more details of the example user device 106 that can be used in the system 100 of FIG. 1. In the example, the user device 106 includes the user interface 112 as described above. In this example, the user device 106 includes a plurality of input devices 140, 142, and a tracking device 144.

The user interface 112 allows the user to interface with the system 100, e.g., to set up an account, log into or log out of an account, input information, request rideshares, enter or modify settings, parameters and preferences, rate ridesharing experiences, receive notifications (e.g., that a rideshare request has been denied), execute fare transactions, and so forth. In some examples, one or more features of the system 100 become available to a user only when enabled by that user. For example, a user may have to open and/or login to a system account through a particular software application residing on the user device 106 in order to request a rideshare from the system 100 or otherwise interact with the system 100.

The input device 140 allows the user to input information or instructions that can be sent to the system 100 via the network 110. For example, the input device 140 can be a touch user interface display screen, a voice command interface, a keyboard, a mouse, etc. The input device 142 is a biometric input device configured to enter user identifying biometric information and submit that information to the system 100. Thus, the input device 142 could include one or more of, e.g., a camera, a fingerprint scanner, an eye scanner, etc. The tracking device 144 can include one or more devices capable of locating the user device 106, such as the example positioning devices described above. The tracking device 144 is configured to locate the user device 106 and also to transmit position information regarding the user device 106 to enable the system 100 to locate the user device when its owner requests a rideshare.

Figure 3:
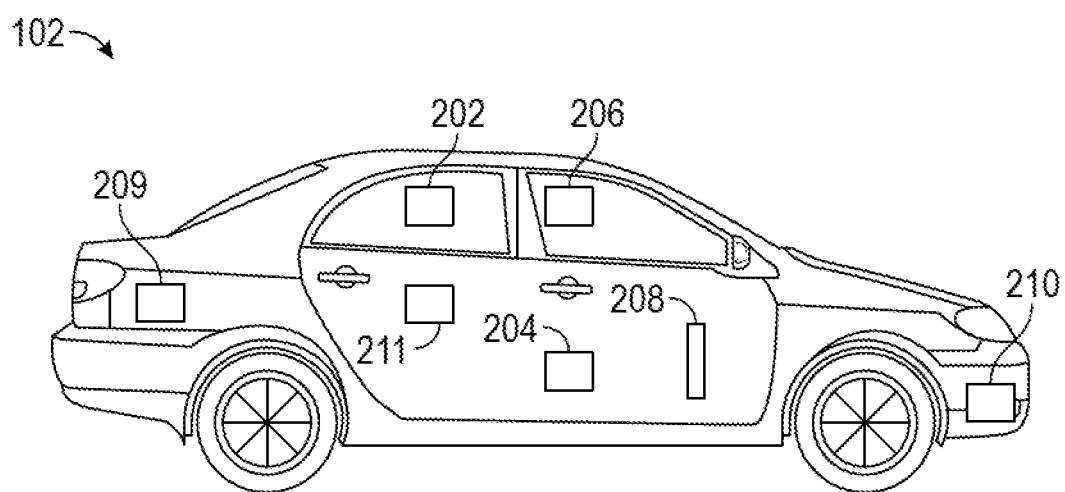
FIG. 3 is a schematic block diagram of an example vehicle of the system of FIG. 1.

FIG. 3 is a schematic block diagram of an example vehicle 102 of the system 100 of FIG. 1. The vehicle 102 includes a first indicator 202 observable outside the vehicle by potential users of the vehicle. The first indicator 202 indicates whether the vehicle 102 has a seat vacancy to accept another passenger. In some examples, the first indicator 202 can also indicate a number of seat vacancies within the vehicle 102. The vehicle 102 also includes one or more biometric readers 204. The biometric readers 204 can include one or more of e.g., a fingerprint scanner, a camera, an eye scanner, etc., that can collect biometric data from a prospective passenger of the system 100 who is outside the vehicle.

The vehicle 102 also includes a second indicator 206 observable outside the vehicle. The second indicator 206 is configured to inform a prospective passenger of the system 100 whether a request to ride in the vehicle 102 is accepted or denied. The vehicle 102 also includes an entry regulator 208 (e.g., a door lock), that selectively permits or denies access to the interior of the vehicle. The vehicle 102 can also include one or more tracking devices 209 capable of locating the vehicle 102, such as the example positioning devices described above. The tracking device 209 is configured to locate the vehicle 102 and also to transmit position information regarding the vehicle 102 to enable the system 100 to locate the vehicle 102 at a given point in time.

The vehicle 102 can also include one or more interior monitoring devices 211, such as a microphone or video camera for monitoring conditions internal to the vehicle, such as vehicle cleanliness, passenger behavior, etc. The vehicle 102 can include hardware 210 configured to interact with the server 104 via the network 110 and to transmit information between the server 104, the first indicator 202, the biometric reader(s) 204, the second indicator 206, the entry regulator 208, the one or more tracking devices 209, and the one or more interior monitoring devices 211.

Figure 4:
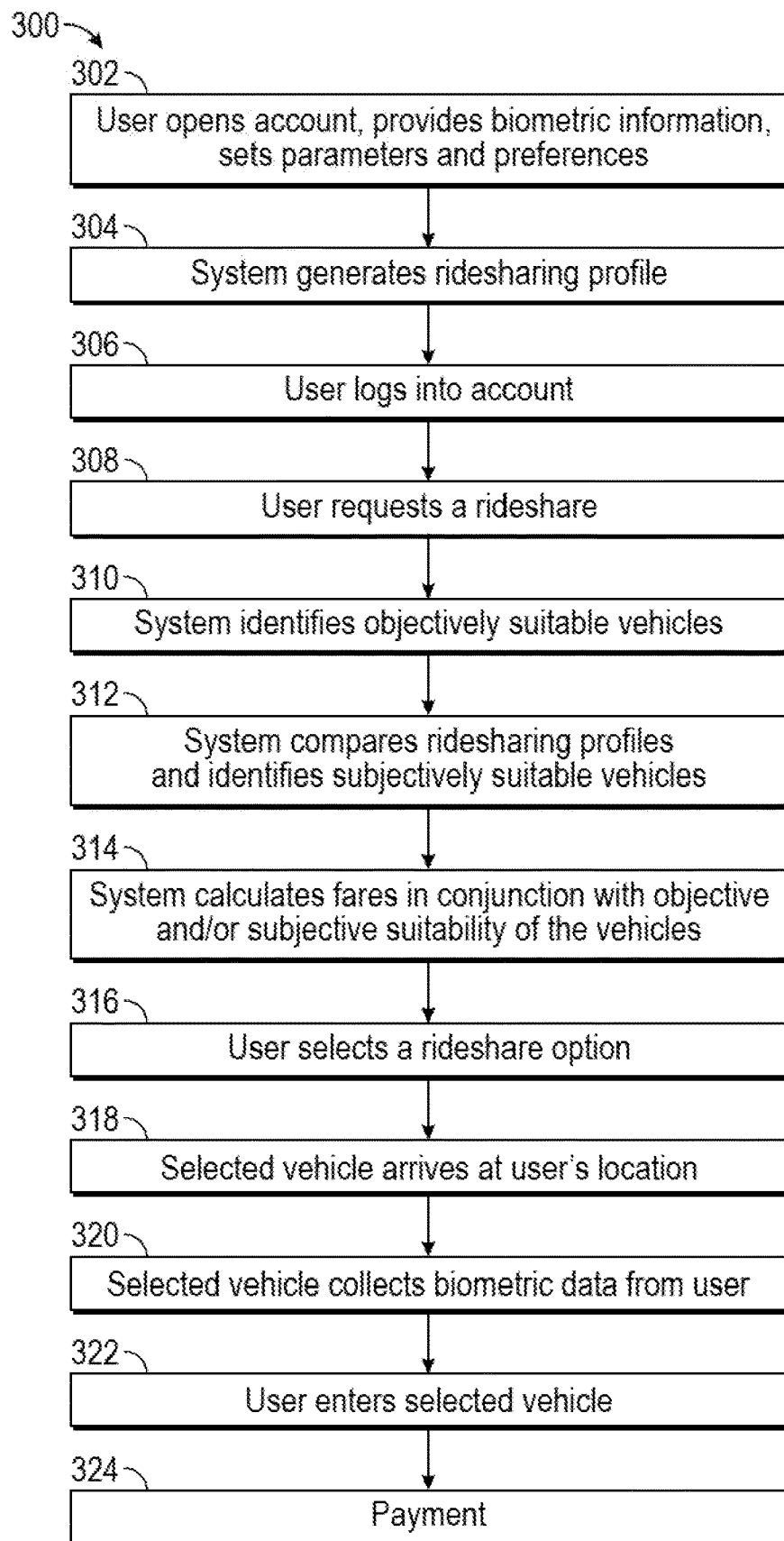
FIG. 4 is a flow diagram illustrating an example of a process of using the system of FIG. 1.

FIG. 4 is a flow diagram illustrating an example of a process 300 of using the system 100 of FIG. 1.

In a step 302, a prospective user connects to the server 104 of the system 100, e.g., by downloading a software application onto their user device 106 and setting up a user account with the system 100 via the user initiation module 122, establishing settings, permissions, preferences, parameters, and the like. Authentication credentials, e.g., a login name and password, security questions, etc., can be established to mitigate the chances of unauthorized access to the system 100 through the user's account. The user account is linked to at least one financial account of the user (e.g., a credit card account or bank account).

As part of the step 302, the user can set permissions that link/provide access of the server 104 to one or more information sources, e.g., social media accounts held by the user, location devices, financial account, etc. In addition, the user can submit characteristics about themselves, which identify one or more of the user's actual parameters that may be relevant to other users' desire to ride with them (and therefore relevant to calculating reciprocal match scores), and can also set modifiable determinative and relevant objective and subjective ridesharing parameter preferences as described above. One or more pieces of the characteristics and/or objective and/or subjective parameter preferences can be incorporated into a ridesharing profile associated with the user. In addition, as part of the step 302 the user can enter biometric identifying information that can be processed by the passenger verification module 126.

In a step 304, the data mining module 124 collects additional parameter and parameter preference information about the user from one or more sources and completes a ridesharing profile for the user based on that information and any parameter information and subjective and objective ridesharing parameter preferences provided by the user. The ridesharing profile can be stored in a database, e.g., the database 108 of the system 100.

In a step 306 the user logs into their user account via the user device 106.

In a step 308 the user (now a prospective passenger) requests a rideshare via the user device 106. In some examples, at or around the time that the prospective passenger requests the rideshare the prospective passenger also provides information to the server 104, e.g., information regarding the prospective passenger's desired destination and/or desired fare or range of fares for the requested rideshare.

In a step 310 the vehicle network module 128 compares a location of the user device 106 and the requested destination of the prospective passenger to the locations and destinations of vehicles in the system 100 and identifies one or more suitable vehicles of the system 100 that meet or exceed a predefined minimum vehicle value by analyzing parameters of those vehicles in conjunction with one or more objective parameter preferences provided by the prospective passenger and/or one or more objective parameters that are predefined by the system 100.

In a step 312 the passenger comparison module 130 compares the ridesharing profile of the prospective passenger to the ridesharing profiles of the passengers. The passenger comparison module 130 can calculate both individual and reciprocal match scores. In some examples vehicles that yield reciprocal and/or individual match scores above predetermined thresholds are offered to the user as vehicle rideshare options.

It should be appreciated that the system 100 is also configured to group a plurality of prospective passengers in the same vehicle. That is, the system 100 can process multiple rideshare requests from multiple users and assign a vehicle to a group of those prospective passengers before picking up any of those users in the vehicle. The grouping can be based on objective and/or subjective parameters and preferences of the assigned prospective users, as well as preferences of any passengers who may already be riding in that vehicle.

In a step 314 the ride pricing module 132 sets a projected fare for each of the rideshare options that is partially correlated to the individual match score (and/or the reciprocal match score) of the prospective passenger for that vehicle. In some examples the projected fare for each rideshare can also partially depend on other factors, such as the number of passengers in the vehicle. The projected fares are presented to the prospective passenger along with their corresponding rideshare options.

In a step 316 the prospective passenger selects a rideshare option.

In a step 318, the vehicle corresponding to the selected rideshare option is dispatched and arrives at the location of the user device 106.

In a step 320, the selected vehicle collects biometric data from the prospective passenger at the prospective passenger's location and the passenger verification module 126 processes the collected biometric data to verify the identity of the prospective passenger.

If the identity of the prospective passenger is confirmed, in a step 322 the prospective passenger is granted access to the vehicle. If the identity of the prospective passenger is not confirmed, in some examples, the process 300 terminates. In some examples, before the prospective passenger is granted access, any other passengers already in the vehicle must first approve, e.g., via their own user devices or via an interactive device installed in the vehicle, the prospective passenger's entry to the vehicle. In some examples, a passenger's denying entry to the vehicle of a prospective passenger can increase that passenger's fare. Conversely, in some examples, depending on the individual match scores calculated, a passenger's accepting entry to the vehicle of a prospective passenger can decrease that passenger's fare.

In a step 324 the prospective passenger (now a passenger) reaches their destination and exits the vehicle, and the ride payment module 134 executes a payment from a financial account of the passenger to pay for the rideshare fare.

Figure 5:
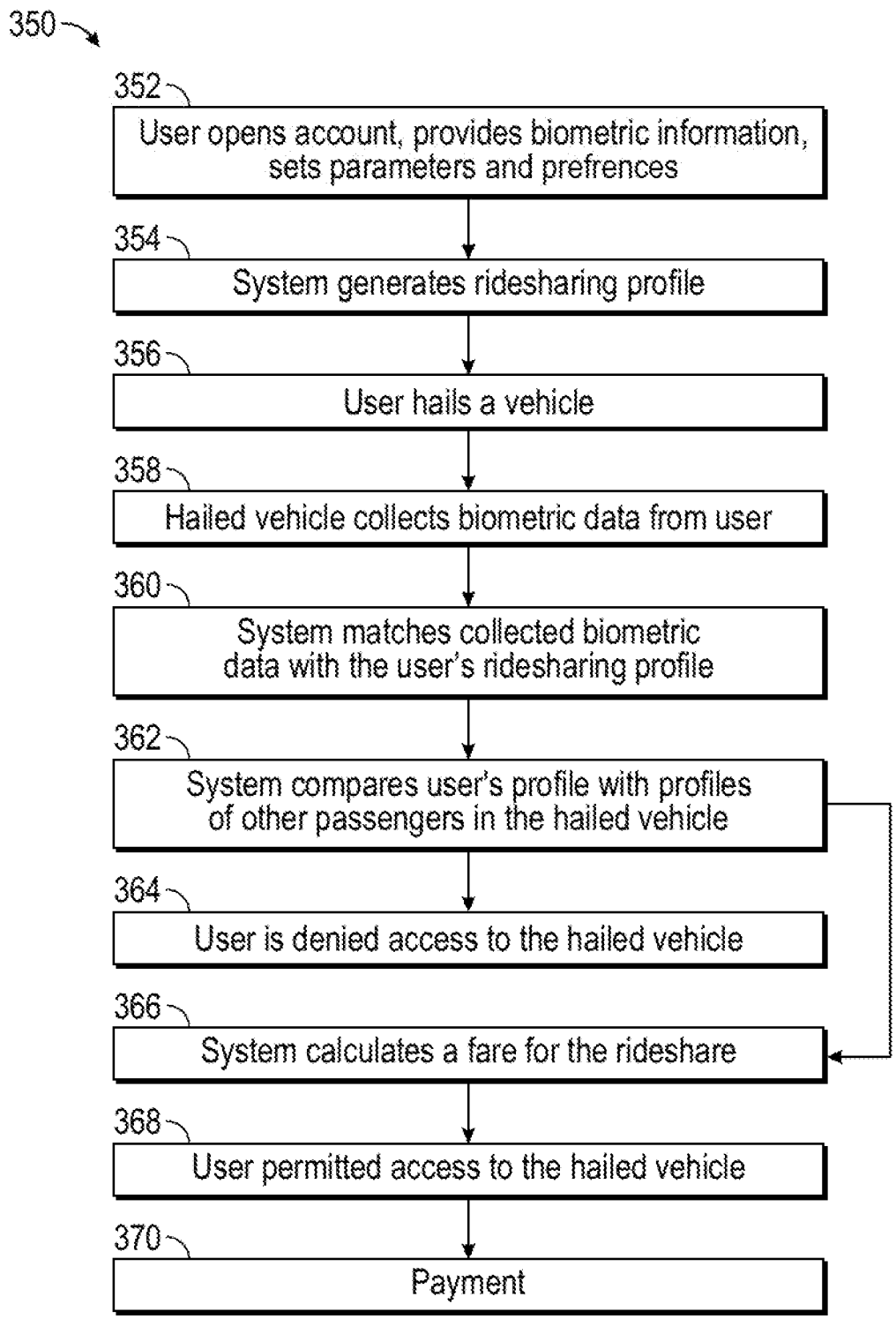
FIG. 5 is a flow diagram illustrating another example of a process of using the system of FIG. 1.

FIG. 5 is a flow diagram illustrating another example of a process 350 of using the system 100 of FIG. 1.

In a step 352, a prospective user connects to the server 104 of the system 100, e.g., by downloading a software application onto their user device 106 and setting up a user account with the system 100 via the user initiation module 122, establishing settings, permissions, preferences, parameters, and the like. Authentication credentials, e.g., a login name and password, security questions, etc., can be established to mitigate the chances of unauthorized access to the system 100 through the user's account. The user account is linked to at least one financial account of the user (e.g., a credit card account or bank account).

As part of the step 352, the user can set permissions that link/provide access of the server 104 to one or more information sources, e.g., social media accounts held by the user, location devices, financial account, etc. In addition, the user can submit characteristics about themselves, which identify one or more of the user's actual parameters that may be relevant to other users' desire to ride with them (and therefore relevant to calculating reciprocal match scores), and can also set modifiable determinative and relevant objective and subjective ridesharing parameter preferences as described above. One or more pieces of the characteristics and/or objective and/or subjective parameter preferences can be incorporated into a ridesharing profile associated with the user. In addition, as part of the step 352 the user can enter biometric identifying information that can be processed by the passenger verification module 126.

In a step 354, the data mining module 124 collects additional parameter and parameter preference information about the user from one or more sources and completes a ridesharing profile for the user based on that information and any parameter information and subjective and objective ridesharing parameter preferences provided by the user. The ridesharing profile can be stored in a database, e.g., the database 108 of the system 100.

In a step 356 the user (now a prospective passenger) hails a vehicle of the system 100 on the street, the vehicle exhibiting an indicator indicating that at least one seat is available in the vehicle.

In a step 358 the hailed vehicle collects biometric data from the prospective passenger. In some examples the hailed vehicle also collects other information from the prospective passenger, e.g., the prospective passenger's desired destination and/or desired fare or range of fares.

In a step 360 the passenger verification module 126 cross-references the collected biometric data with the prospective passenger's ridesharing profile.

In a step 362 the passenger comparison module 130 compares the ridesharing profile of the prospective passenger to the ridesharing profiles of any other passengers in the hailed vehicle and calculates individual and/or reciprocal match scores.

If the comparison in step 362 yields a reciprocal match score that falls below a predefined minimum match score, in a step 364 an indicator exhibits a notification to the prospective passenger that they have been denied access to the vehicle. In some examples, the system 100 then attempts to identify one or more other vehicles with sufficiently high reciprocal match scores with the prospective passenger to accept the prospective passenger, and presents such other vehicle(s) as rideshare option(s) to the prospective passenger.

If the comparison in step 362 yields a reciprocal match score at or above a predefined minimum match score, in a step 366 the ride pricing module 132 calculates a fare for the rideshare. In some examples, the amount of the calculated fare is correlated to the individual (and/or reciprocal) match score of the prospective passenger.

In some examples the amount of the calculated fare can also partially depend on other factors, such as the number of passengers in the vehicle. If the prospective passenger accepts the fare, in a step 368 the system permits access of the prospective passenger (now a passenger) into the vehicle, and in a step 370, the passenger reaches their destination and exits the vehicle, and the ride payment module 134 executes a payment from a financial account of the passenger to pay for the rideshare fare. However, in some examples, before the prospective passenger is permitted access to the vehicle, any other passengers already in the vehicle must first approve, e.g., via their own user devices or via an interactive device installed in the vehicle, the prospective passenger's entry to the vehicle. In some examples, a passenger's denying entry to the vehicle of prospective passenger can increase that passenger's fare. Conversely, in some examples, depending on individual and/or reciprocal match scores, a passenger's accepting entry to the vehicle of a prospective passenger can decrease that passenger's fare.

If the prospective passenger does not accept the fare, in some examples the system 100 then attempts to identify one or more other vehicles with sufficiently high reciprocal match scores with the prospective passenger, and sufficiently low fares, to accommodate the prospective passenger, and presents such other vehicle(s) as rideshare option(s) to the prospective passenger.

It should be appreciated that the processes of using the system 100 can involve steps from both the example process 300 and the example process 350. For example, if a prospective passenger attempts to hail a vehicle and is denied access to the hailed vehicle (step 364), at that point the prospective passenger can proceed to step 308 of the process 300 and request a rideshare via the user device 106. It should also be appreciated that not all of the examples steps provided in the example processes 300 and 350 need to be executed to take advantage of the system 100.

Figure 6:
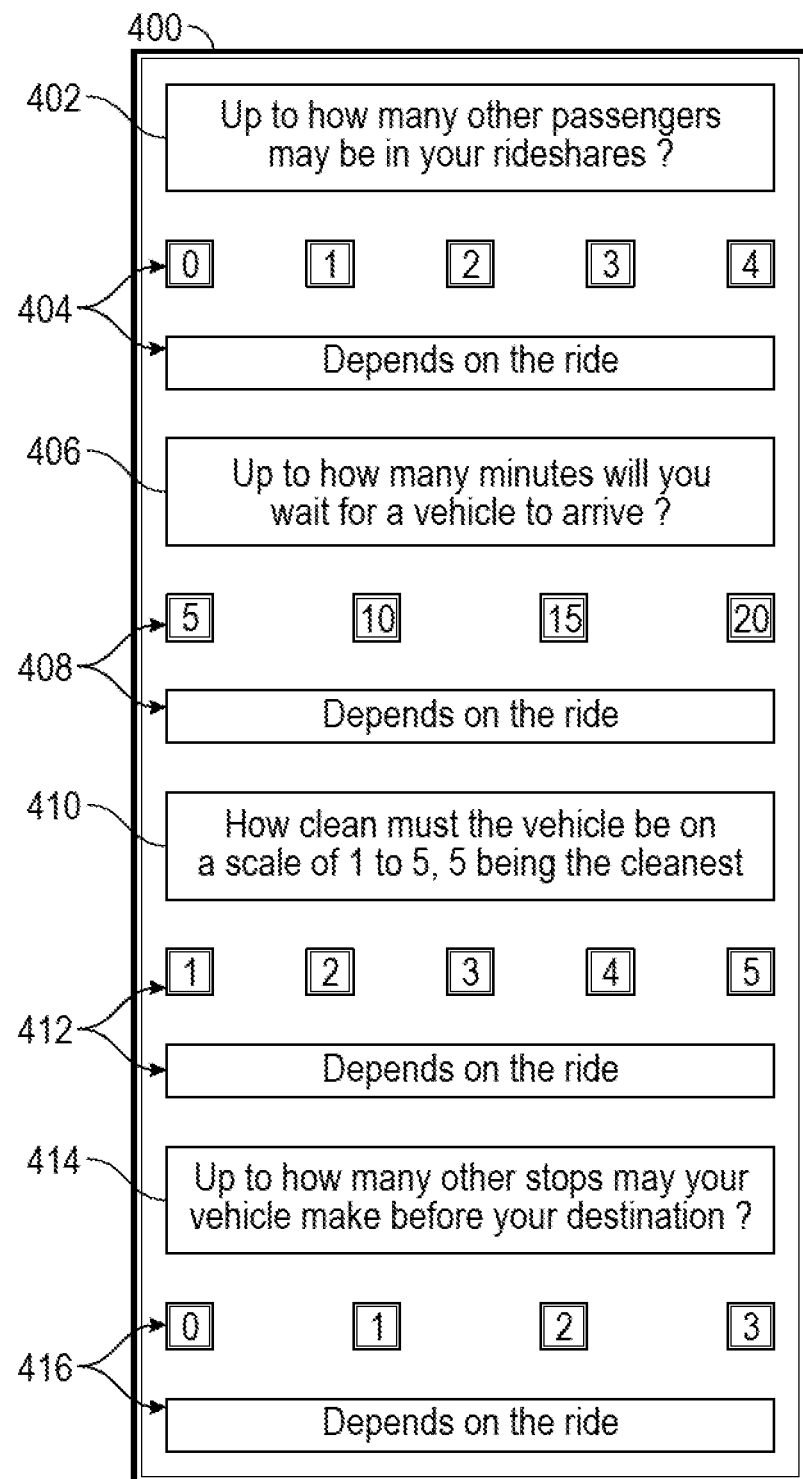
FIG. 6 depicts an example user interface display showing an example user input screen on a user device of the system of FIG. 1.

FIG. 6 depicts an example user interface display 400 showing an example user input screen on the user interface 112 of the user device 106 of FIG. 1. This user interface display 400 can be displayed to the user on the user device 106 in conjunction with the processes 300 and 350 described above. In some examples, these displays are generated when the process 300 utilizes the step 302 or when the process 350 utilizes the step 352.

The user interface display 400 is directed to collecting objective rideshare parameter preference information from the user. As described above, such objective parameter preferences can be used by the system to identify potentially appropriate vehicles to pick up a user following a rideshare request. The user interface display 400 includes an information prompt 402 asking the user to provide, for all rideshares the user may request, the maximum number of other passengers the user would accept in the vehicle. Selectable options 404 follow the prompt 402. In this example, one of the selectable options indicates that the number of acceptable other passengers in the vehicle depends on the ride; that is, this parameter is not pre-set, but rather it is set at the time of requesting a rideshare. For example, a user who may prefer to ride alone after a long day of work, but would be happy to ride with up to three other passengers when travelling to the airport, could select the "Depends on the ride" option.

The user interface display 400 includes additional information prompts 406, 410, and 414, with sets 408, 412, and 416 of selectable options following each. Each of the information prompts 406, 410, and 414 is directed to collect objective parameter information regarding the user's preferences for rideshares. The information prompt 406 is directed to how long the user is willing to wait for the vehicle arrive at the user's destination. The information prompt 410 is directed to the cleanliness of the vehicle. The information prompt 414 is directed to the number of stops taken by the vehicle before reaching the user's destination. Each set 408, 412, and 416 of selectable options includes a "depends on the ride" option, which selection enables the user to defer setting that parameter preference until a rideshare request is made.

FIG. 7A depicts an example user interface display 420 showing an example user input screen on the user interface 112 of the user device 106 of FIG. 1. This user interface display 420 can be displayed to the user on the user device 106 in conjunction with the processes 300 and 350 described above. In some examples, these displays are generated when the process 300 utilizes the step 302 or when the process 350 utilizes the step 352. In response to the user's responses to the information prompts on the user interface display 420, the system can generate a rideshare profile for the user as in step 304 of the process 300, or step 354 of the process 350.

The user interface display 420 is directed to collecting subjective rideshare parameter preferences information from the user. As described above, such subjective parameter preferences can be used by the system to match the user with other passengers in identifying appropriate vehicles with which to pick up the user following a rideshare request. The user interface display 420 includes an information prompt 422 asking the user to rate, for all rideshares the user may take, the importance to the user of various subjective parameter preferences. A rating of one indicates no importance such that the system 100 can disregard that parameter preference when comparing the user's ridesharing profile with other passenger ridesharing profiles. A rating of five indicates that the user's preference for that parameter is essential, i.e., that parameter preference is determinative. Ratings of two, three or four indicate that the parameter preference is relevant but not determinative, the amount of relevance increasing from two to three to four.

The importance of any number of subjective parameter preferences can be surveyed using an interface display such as the user interface display 420. In this example, the user is prompted to rate the importance of fellow passengers' age in block 424, fellow passengers' gender in block 426, fellow passengers' level of education in block 428, fellow passengers' political persuasion in block 430, fellow passengers' profession in block 432, fellow passengers' tendency towards silence in block 434, and fellow passengers' tendency towards loquaciousness in block 436.

FIG. 7B depicts an example user interface display 440 showing an example user input screen on the user interface 112 of the user device 106 of FIG. 1. This user interface display 440 can be displayed to the user on the user device 106 immediately after the user entered the requested information via the user interface display 420 of FIG. 7A.

The user interface display 440 includes a notice 442 to the user notifying them of the subjective parameter preferences the user has deemed relevant or determinative. The notice 442 also prompts the user to enter preferences that define each of the relevant and determinative parameter preferences. In this example, it is presumed that the user has identified, age, gender, education, political persuasion, and profession as relevant or determinative parameter preferences, and the talkativeness of fellow passengers as a no importance parameter preference. The user can define their preferences for each of the determinative and relevant parameters by submitting this information via the age block 444, the gender block 446, the education block, 448, the politics block 450, and the profession block 452, each of which includes one or more pre-defined selectable preference options and/or a user-definable ("other") option. The information submitted to the server 104 via the user interface display 440 can be used in generating the preference aspects of the ridesharing profile of the user.

In some examples, subjective parameter importance and preferences for a given user are pre-set by the user, e.g., when opening an account on the system 100. In such examples, when that user requests a rideshare, the system 100 can bypass requesting the user for information related to subjective parameters, and automatically search for available rideshares that meet that user's pre-set subjective parameter preferences. Similarly, when requesting a rideshare, the system 100 can prompt the requesting user for parameter preferences related to parameters about which the system does not have sufficient information. For example, the system can have pre-set preferences for a user in the categories of political persuasion, age, profession and education, but insufficient information regarding that user's preference for gender. In such examples, the user interface display 440 can prompt the user to input their gender preference only.

In some examples, subjective parameter importance and preferences for a given user can also, or alternatively, be pre-set based on information about the user gleaned by the system 100, e.g., via the data mining module 124.

Figure 8:
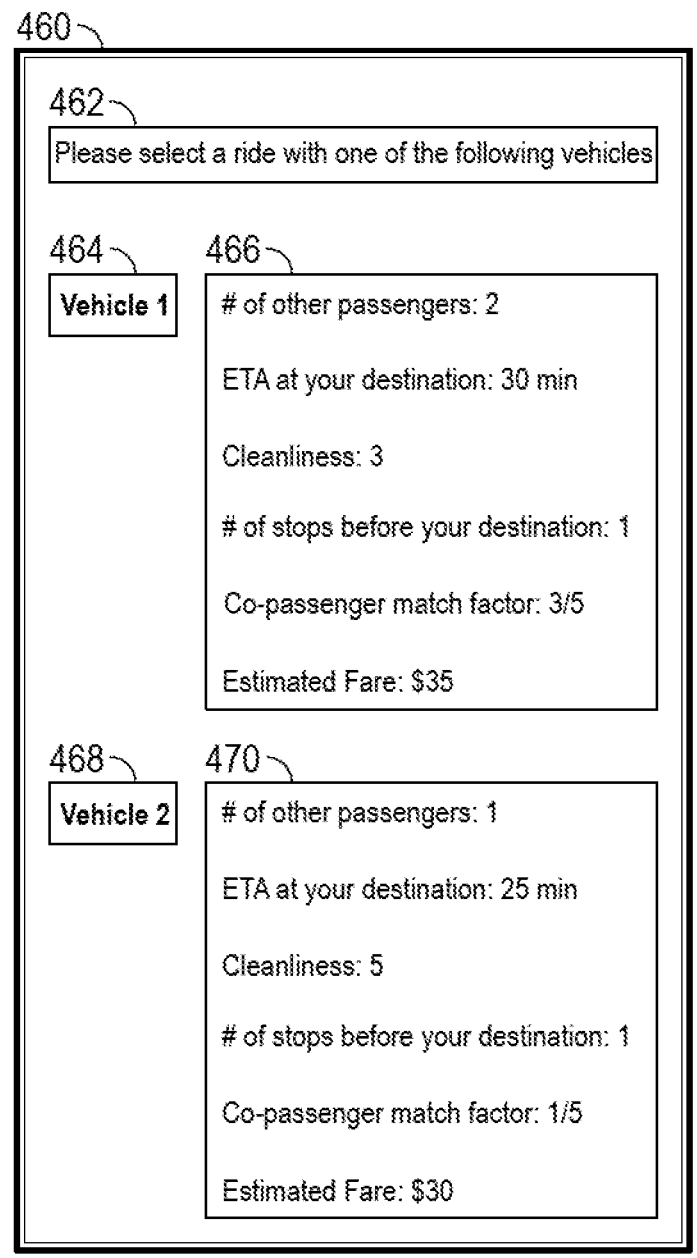
FIG. 8 depicts a further example user interface display showing an example user input screen on a user device of the system of FIG. 1.

Pre-set subjective parameter importance and preferences, whether passively gleaned by the system or affirmatively submitted by the user, can be overridden and/or modified by the user at any appropriate time. For example, the user can select to revise their pre-set parameters when requesting a specific rideshare. Revisions can be temporary (e.g., for a specific rideshare) or permanent (e.g., set for all rideshares until further revisions are made in the future). FIG. 8 depicts an example user interface display 460 showing an example user input screen on the user interface 112 of the user device 106 of FIG. 1. This user interface display 460 can be displayed to the user after, e.g., the user has logged into their account and requested a rideshare, e.g., following step 308 of the process 300. Based on objective and subjective parameters and parameter preferences, including comparing ridesharing profiles, the system 100 has identified two potential vehicles (Vehicle 1 and Vehicle 2) within the system that have high enough vehicle values and reciprocal match scores such that they would be suitable for picking up the user.

The user interface display 460 includes a prompt 462, asking the user to pick one of two identified vehicles. The user interface display 460 includes a selectable option 464 for Vehicle 1 and a selectable option 468 for Vehicle 2. A notification 466 provides information about Vehicle 1 and a notification 470 provides information about Vehicle 2. The information can include information relating to subjective and objective parameters concerning each vehicle. In this example, the information also includes an estimated fare for riding in each vehicle. As shown, the fare for Vehicle 2 is less than the fare for Vehicle 1, which could be a result of one or more of the subjective or objective parameters of Vehicle 2 being less favorable to the user than those of Vehicle 1. For example, the notification 470 indicates the prospective passenger's individual match score (i.e., how compatible the prospective passenger's preferences were with the vehicle's passenger's parameters), which suggests that the one passenger of Vehicle 2 is less compatible with the user than the two passengers of Vehicle 1, which has resulted in a discounted fare for Vehicle 2, despite the fact that certain other parameters of Vehicle 2 (e.g., the cleanliness) are more desirable than those of Vehicle 1.

FIG. 9A depicts an example user interface display 476 showing an example user input screen on the user interface 112 of the user device 106 of FIG. 1. This user interface display 476 can be displayed to the user after, e.g., a rideshare has been completed (e.g., after the step 322 of the process 300 or after the step 368 of the process 350).

The example user interface display 476 includes a notification 478 to the user that rideshare is complete and that their financial account linked to the system 100 has been charged for the fare. In some examples, the user interface display 476 can follow the user interface display 460, in which case it can be assumed that the user selected Vehicle 2 from the user interface display 460. The notification 478 also prompts the user rate the ridesharing experience. An example first rating block 480 enables the user to rate the fare. An example second rating block 482 enables the user to rate the vehicle's cleanliness. An example third rating block 484 enables the user to rate the other passengers in the vehicle, with the option N/A available in the event there were no other passengers in the vehicle.

If the user indicates that their passenger experience was negative or unsatisfactory, in some examples the example user interface display 486 of FIG. 9B can then be displayed on the user device 106. The user interface display 486 includes a prompt 488 requesting that the user identify one or more aspects of the other passengers that made them unsatisfactory. In this example, the selectable aspects 490 include each of the subjective parameter preferences identified by the user as being relevant or determinative as well as a user-definable aspect.

Ride ratings submissions by the user, such as those submitted via the user interface displays of FIGS. 9A and 9B, to the extent those ratings are inconsistent with the user's existing ridesharing profile, can cause the system 100 to adjust the user's ridesharing profile, the system essentially learning about users' ridesharing parameters and preferences from their actual ridesharing experiences. For example, if the user had indicated a relevant (not determinative) preference for riding with Democrats, but also submitted, via the user interface display 486, that the rideshare was unsatisfactory because of the other passenger's political persuasion, the system 100 can perform any number of adjusting actions. For example, the system 100 can increase the importance of the political persuasion parameter preference for the user, or prompt the user to consider adjusting their previously submitted level of importance for that parameter preference. In some examples, if the user's submitted reason for an unsatisfactory ride is inconsistent with the reciprocal match score of the user with the other passenger, the system 100 can be configured to perform one or more parameter verification actions, such as confirming the political persuasion of the passenger and the user and comparing their submitted responses to evidence obtained from other information sources, such as social media posts.

Figure 10:
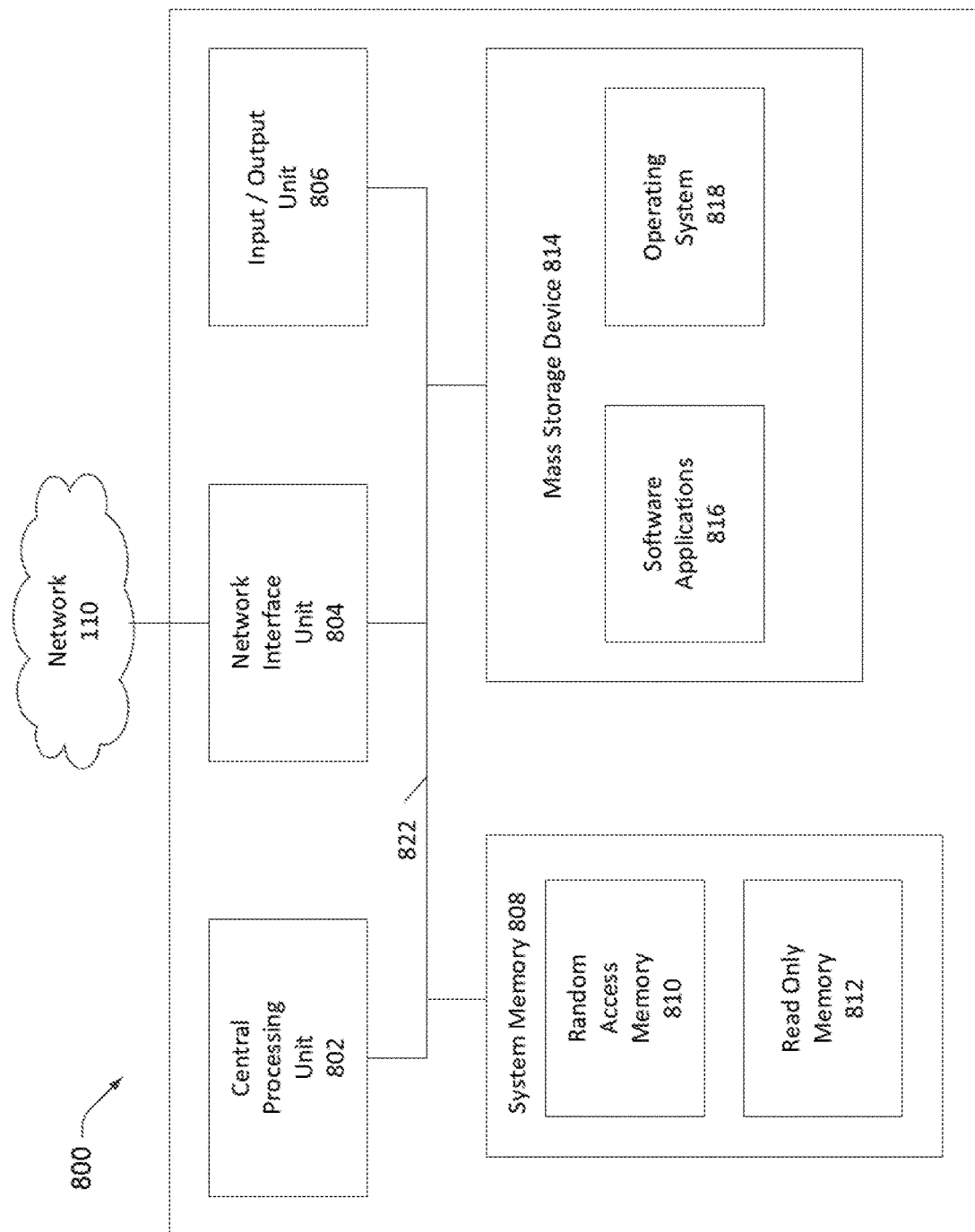
FIG. 10 is a block diagram illustrating portions of an example computer system of the system of FIG. 1.

FIG. 10 schematically illustrates an example computer system suitable for implementing aspects of the system 100 illustrated in FIG. 1, such as the server 104, a third party server, and/or the user device 106. The modules, databases, and other components of these servers and devices could all be implemented on a common computer system, or the various components could be implemented on one or more separate computer systems that are accessible by one another. The computer 800, which may be a server computer, for example, includes at least one central processing unit ("CPU") 802, a system memory 808, and a system bus 822 that couples the system memory 808 to the CPU 802. The system memory 808 includes a random access memory ("RAM") 810 and a read-only memory ("ROM") 812. A basic input/output system that contains the basic routines that help to transfer information between elements within the server computer 800, such as during startup, is stored in the ROM 812. The computer 800 further includes a mass storage device 814. The mass storage device 814 is able to store software instructions and data. One or more of the databases (e.g., the database 108) of the system could be implemented by the mass storage device 814, or one or more of the databases could be implemented by other computer systems accessible by the computer 800.

The mass storage device 814 is connected to the CPU 802 through a mass storage controller (not shown) connected to the system bus 822. The mass storage device 814 and its associated computer-readable data storage media provide non-volatile, non-transitory storage for the server computer 800. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computer 800.

According to various embodiments, the server computer 800 may operate in a networked environment using logical connections to remote network devices (such as the others of the server 104, the user device 106, and a third party server) through the network 110, such as a wireless network, the Internet, or another type of network. The server computer 800 may connect to the network 110 through a network interface unit 804 connected to the system bus 822. It should be appreciated that the network interface unit 804 may also be utilized to connect to other types of networks and remote computing systems. The server computer 800 also includes an input/output controller 806 for receiving and processing input from a number of other devices, including the user interface 112 generated on the user device 106 which could include a touch user interface display screen, or another type of input device, as described above. Similarly, the input/output controller 806 may provide output to a touch user interface display screen or other type of output device.

As mentioned briefly above, the mass storage device 814 and the RAM 810 of the server computer 800 can store software instructions and data. The software instructions include an operating system 818 suitable for controlling the operation of the server computer 800. The mass storage device 814 and/or the RAM 810 also store software instructions, that when executed by the CPU 802, cause the server computer 800 to provide the functionality of the server computer 800 discussed in this document. For example, when the server computer 800 corresponds to the server 104, the mass storage device 814 and/or the RAM 810 can store software instructions that, when executed by the CPU 802, cause the server computer 800 to implement the user initiation module 122, the data mining module 124, the passenger verification module 126, the vehicle network module 128, the passenger comparison module 130, the ride pricing module 132, and the ride payment module 134, and any other modules incorporated to perform the various functionalities described.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A system for customizing rideshares, comprising:
a plurality of vehicles, with each of the plurality of vehicles configured to transport a plurality of users, the users including passengers and prospective passengers, wherein each of the plurality of vehicles includes a biometric recognition device, wherein the biometric recognition device is a biometric scanner;
one or more data storage devices storing a set of subjective rideshare compatibility information for each of at least a first prospective passenger and a first passenger of the users;
at least one processor; and
memory encoding instructions that, when executed by the at least one processor, causes the at least one processor to:
calculate a match score between the first prospective passenger and the first passenger based on the set of subjective rideshare compatibility information of the first prospective passenger and the set of subjective rideshare compatibility information of the first passenger, wherein the match score is a measure of mutual compatibility between the first prospective passenger and the first passenger, the mutual compatibility being based on one or more of personal preferences of the first prospective passenger and the first passenger;
upon the match score exceeding a threshold value, offer a first vehicle occupied by the first passenger to the first prospective passenger for rideshare;
set a fare for the prospective passenger based on the match score, wherein the fare is higher for a higher match score;
present the set fare to the prospective passenger;
upon the prospective passenger accepting the presented fare, capture biometric data associated with the prospective passenger, including scanning one or more biometric features of the prospective passenger using the biometric scanner;
upon the biometric recognition device associated with the first vehicle verifying the biometric data of the prospective passenger, allow the prospective passenger to enter the first vehicle by unlocking one or more doors to the first vehicle; and
upon the prospective passenger accepting entry to the first vehicle, decrease the first passenger's fare.

2. The system of claim 1, wherein the instructions, when executed by the at least one processor, cause the at least one processor to:
upon the match score meeting or falling under the threshold value, identify one or more alternate rideshare vehicle options wherein the one or more alternate rideshare vehicle options each include a passenger wherein the match score between the prospective passenger and the passenger of each of the alternate rideshare vehicle options exceeds the threshold value; and
present the identified alternate rideshare vehicle options to the prospective passenger.

3. The system of claim 1, wherein the instructions, when executed by the at least one processor, cause the at least one processor to:
allow the prospective passenger to modify one or more subjective parameters of the rideshare compatibility information of the prospective passenger to receive a reduced fare that is lower than the original fare.

4. The system of claim 1, wherein at least some of the plurality of vehicles are driven autonomously.

5. The system of claim 1, wherein the set of subjective rideshare compatibility information for the first prospective passenger and the first passenger are collected using a data mining module that mines at least one of: social media accounts, web activity, government records, education records and occupation records associated with the first prospective passenger and the first passenger for relevant information.

6. The system of claim 1, wherein the set of subjective rideshare compatibility information for the first prospective passenger and the first passenger are collected by requesting the users to input relevant information.

7. The system of claim 1, wherein the match score is an individual match score that is calculated by comparing the subjective rideshare compatibility information of the first prospective passenger with the subjective rideshare compatibility information of the first passenger.

8. The system of claim 1, wherein the match score is a reciprocal match score that is calculated by comparing the subjective rideshare compatibility information of the first prospective passenger with the subjective rideshare compatibility information of the first passenger and by comparing the subjective rideshare compatibility information of the first passenger with the subjective rideshare compatibility information of the first prospective passenger.

9. The system of claim 1 wherein the set of subjective rideshare compatibility information includes at least one of: socioeconomic preferences; socioeconomic characteristics; political preferences; political characteristics; gender preferences; gender characteristics; age preferences; age characteristics; social tendency preferences; and social tendency characteristics.

10. A computer implemented method performed by one or more processors for customizing rideshares among a plurality of vehicles, each vehicle of the plurality of vehicles being configured to transport a plurality of users, comprising:

calculating a match score between a first prospective passenger and a first passenger based on a set of subjective rideshare compatibility information of the first prospective passenger and the set of subjective rideshare compatibility information of the first passenger, wherein the match score is a measure of mutual compatibility between the first prospective passenger and the first passenger, the mutual compatibility being based on one or more of personal preferences of the first prospective passenger and the first passenger;

upon the match score exceeding a threshold value, offering a first vehicle occupied by the first passenger to the first prospective passenger for rideshare;

setting a fare for the prospective passenger based on the match score, wherein the fare is higher for a higher match score;

presenting the set fare to the prospective passenger;

upon the prospective passenger accepting the presented fare, capturing biometric data associated with the prospective passenger, including scanning one or more biometric features of the prospective passenger using a biometric scanner associated with the first vehicle;

upon the biometric scanner associated with the first vehicle verifying the biometric data of the prospective passenger, allowing the prospective passenger to enter the first vehicle by unlocking one or more doors to the first vehicle; and upon the prospective passenger accepting entry to the first vehicle, decreasing the first passenger's fare.

11. The computer implemented method of claim 10, further comprising:

upon the match score meeting or falling under the threshold value, identifying one or more alternate rideshare vehicle options wherein the one or more alternate rideshare vehicle options each include a passenger wherein the match score between the prospective passenger and the passenger of each of the alternate rideshare vehicle options exceeds the threshold value; and presenting the identified alternate rideshare vehicle options to the prospective passenger.

12. The computer implemented method of claim 10, further comprising allowing the prospective passenger to modify one or more subjective parameters of the rideshare compatibility information of the prospective passenger to receive a reduced fare that is lower than the original fare.

13. The computer implemented method of claim 10, wherein at least some of the plurality of vehicles are driven autonomously.

14. The computer implemented method of claim 10, wherein the set of subjective rideshare compatibility information for the first prospective passenger and the first passenger are collected using a data mining module that mines at least one of: social media accounts, web activity, government records, education records and occupation records associated with the first prospective passenger and the first passenger for relevant information.

15. The computer implemented method of claim 10, wherein the set of subjective rideshare compatibility information for the first prospective passenger and the first passenger are collected by requesting the users to input relevant information.

16. The computer implemented method of claim 10, wherein the match score is an individual match score that is calculated by comparing the subjective rideshare compatibility information of the first prospective passenger with the subjective rideshare compatibility information of the first passenger.

17. The computer implemented method of claim 10, wherein the match score is a reciprocal match score that is calculated by comparing the subjective rideshare compatibility information of the first prospective passenger with the subjective rideshare compatibility information of the first passenger and by comparing the subjective rideshare compatibility information of the first passenger with the subjective rideshare compatibility information of the first prospective passenger.

18. The computer implemented method of claim 10, wherein the set of subjective rideshare compatibility information includes at least one of: socioeconomic preferences; socioeconomic characteristics; political preferences; political characteristics; gender preferences; gender characteristics; age preferences; age characteristics; social tendency preferences; and social tendency characteristics.

* * * * *